April 19, 1932. P. J. MESSER 1,854,753
MACHINE FOR MAKING GLASS ARTICLES
Original Filed Oct. 24, 1923 11 Sheets-Sheet 6
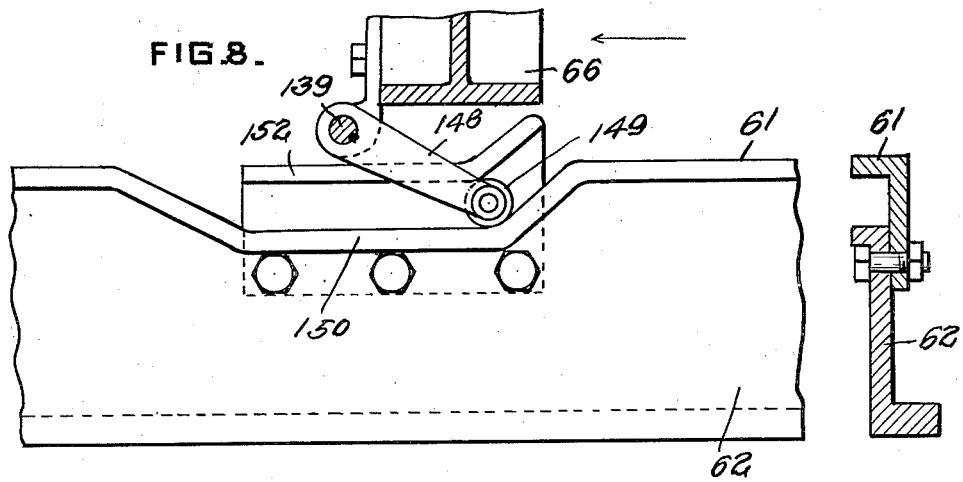
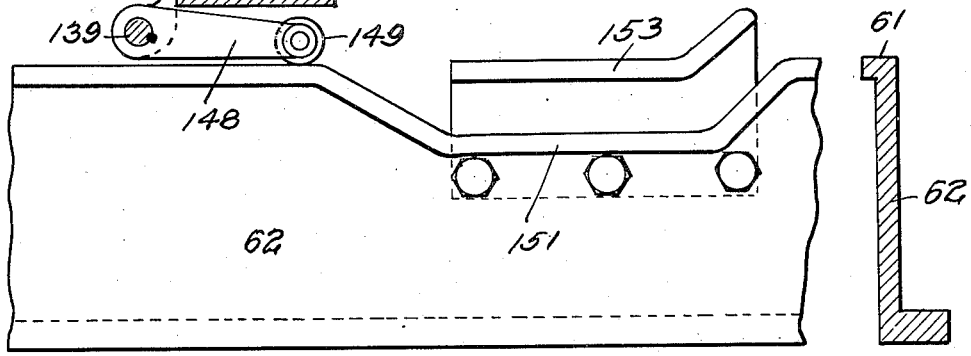
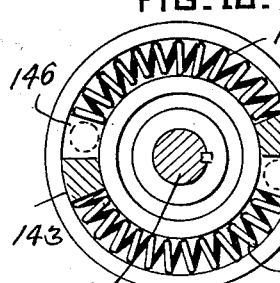
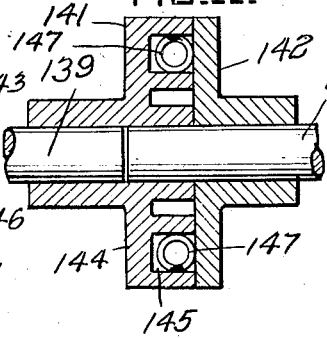
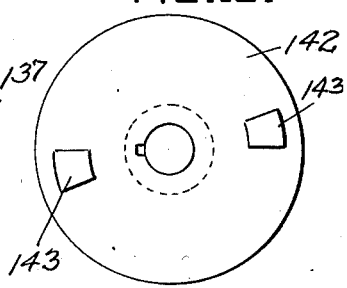
INVENTOR April 19, 1932. P. J. MESSER 1,854,753
MACHINE FOR MAKING GLASS ARTICLES
Original Filed Oct. 24, 1923 11 Sheets-Sheet 7
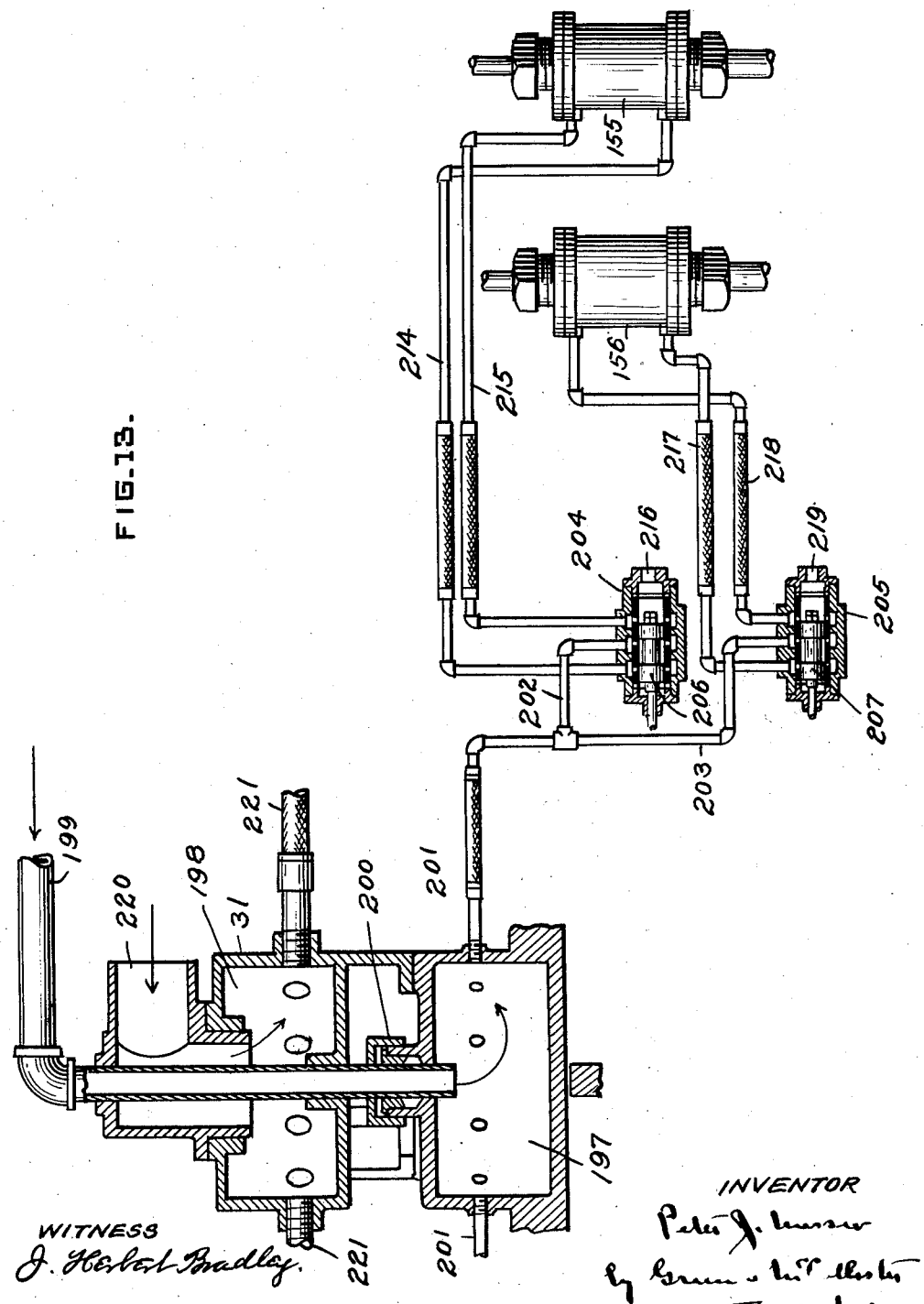

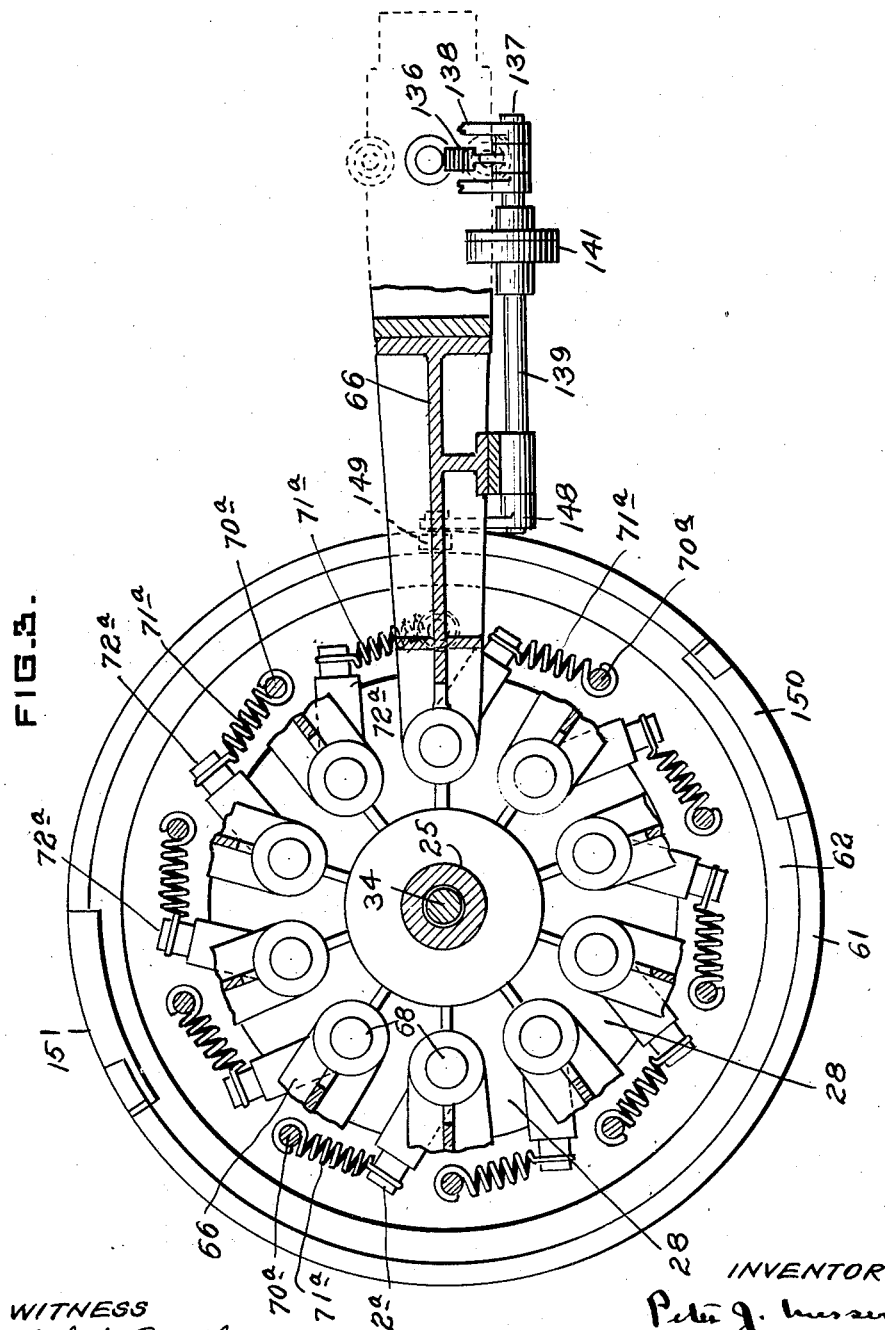

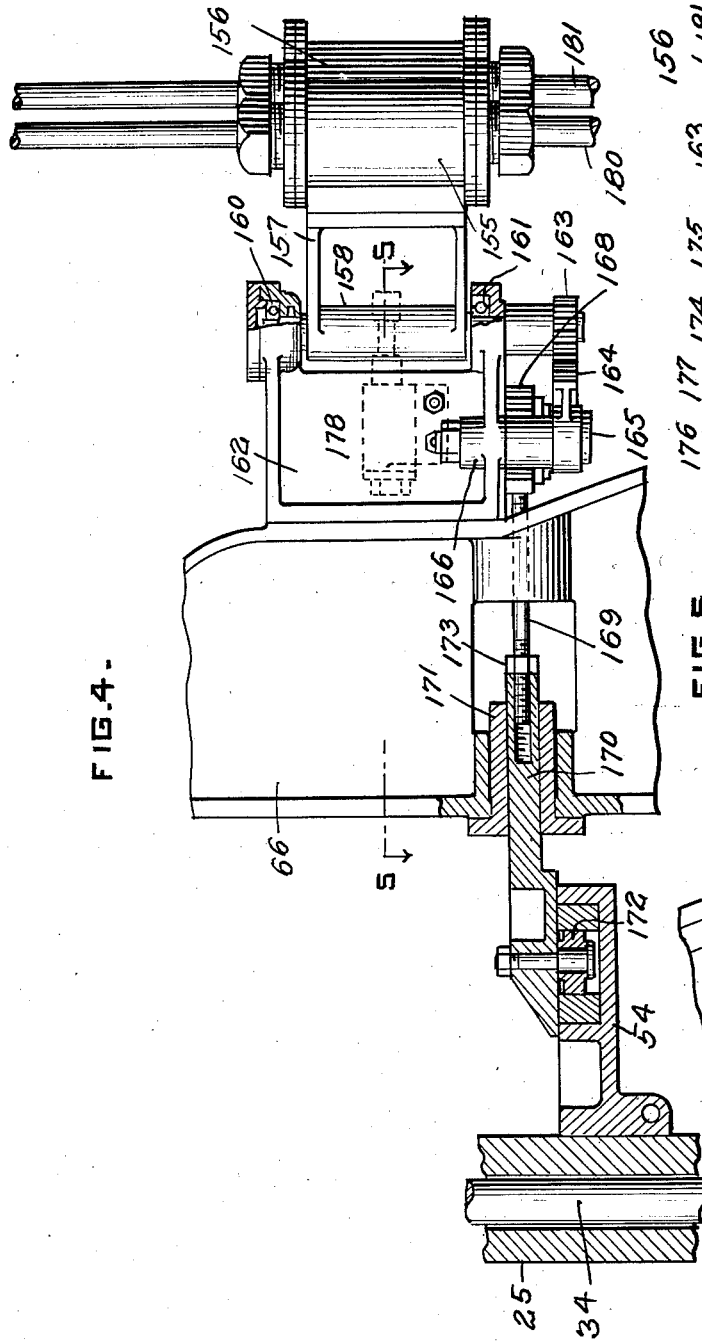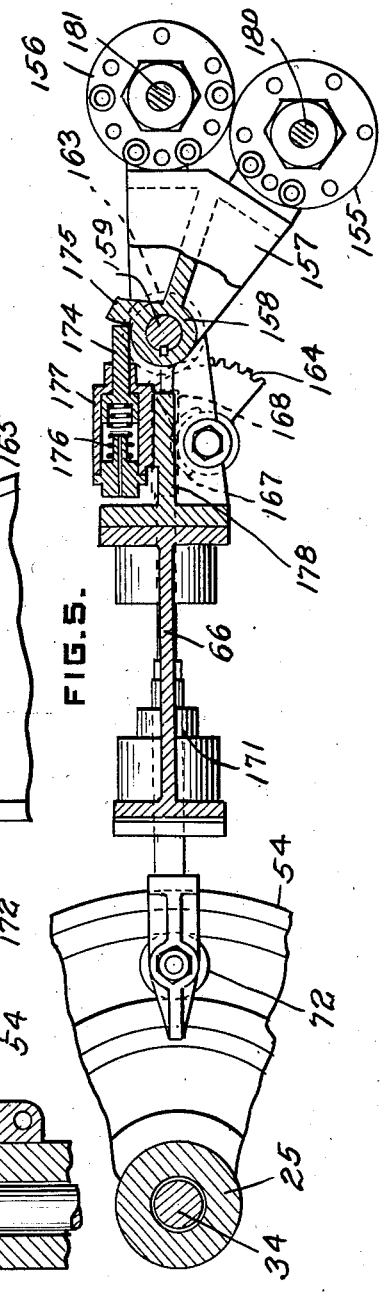

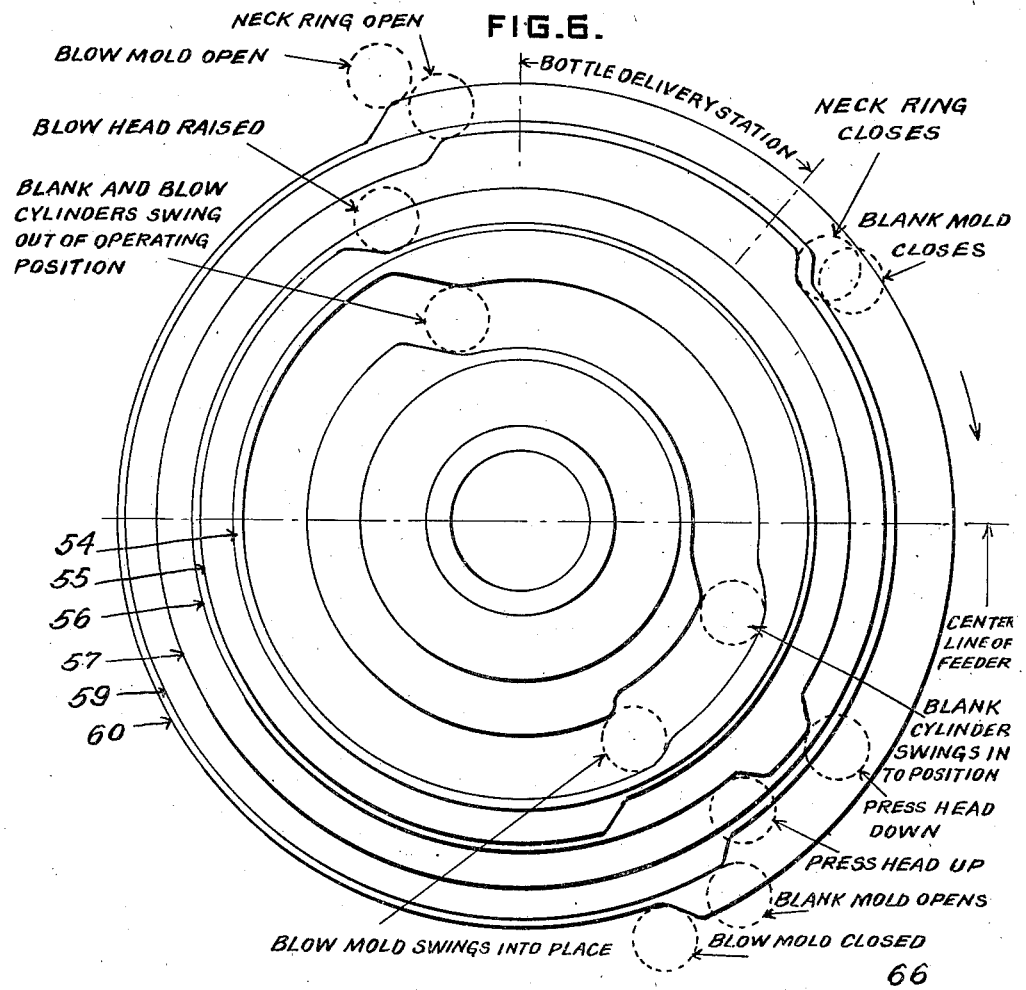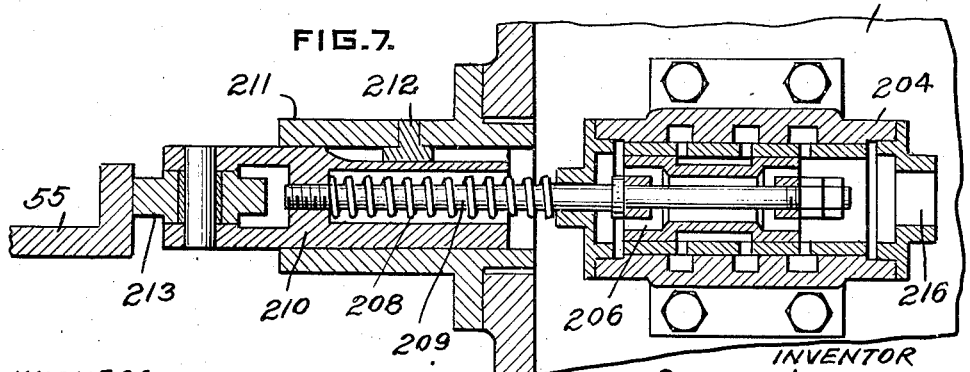

April 19, 1932.   P. J. MESSER   1,854,753
MACHINE FOR MAKING GLASS ARTICLES
Original Filed Oct. 24, 1923   11 Sheets-Sheet 8

April 19, 1932. P. J. MESSER 1,854,753
MACHINE FOR MAKING GLASS ARTICLES
Original Filed Oct. 24, 1923  11 Sheets-Sheet 9
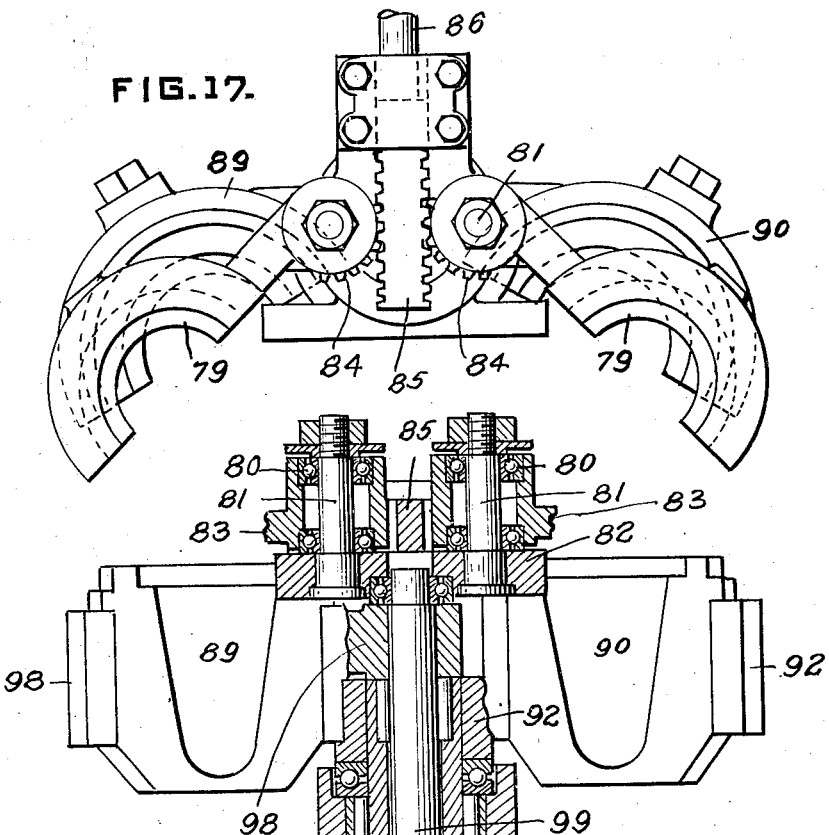
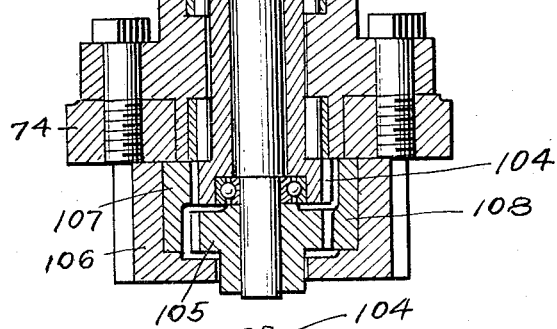
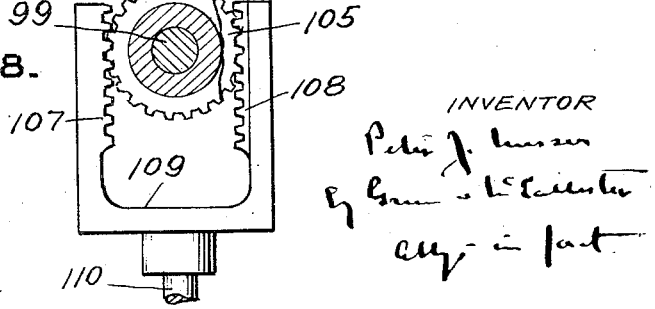

April 19, 1932. P. J. MESSER 1,854,753
MACHINE FOR MAKING GLASS ARTICLES
Original Filed Oct. 24, 1923 11 Sheets-Sheet 10

April 19, 1932.  P. J. MESSER  1,854,753
MACHINE FOR MAKING GLASS ARTICLES
Original Filed Oct. 24, 1923   11 Sheets-Sheet 11

Patented Apr. 19, 1932

1,854,753

UNITED STATES PATENT OFFICE

PETER J. MESSER, OF OLEAN, NEW YORK

MACHINE FOR MAKING GLASS ARTICLES

Application filed October 24, 1923, Serial No. 670,491. Renewed August 12, 1931.

This invention relates to machines for manufacturing glass ware and particularly to that class of machines in which the articles are partially formed by a pressing operation and completed by a blowing operation.

An object of this invention is to produce a continuously operating pressing and blowing machine which may be operated in conjunction with an automatic glass feeder so adjusted as to deliver quotas of glass at regular relatively short intervals of time.

Another object of this invention is to produce a continuously operating multiple unit pressing and blowing machine which may be operated in conjunction with an automatic glass feeder and in which each unit upon arrival at the delivery point of the glass feeder is caused to lag behind the other units a sufficient time to receive a quota of glass.

A further object of this invention is to produce a continuously operating multiple unit pressing and blowing machine of simple rugged construction and high capacity and in which the individual units may be readily removed and replaced by other units in a relatively short time and without dismantling the machine.

A still further object of this invention is to produce a continuously operating multiple unit pressing and blowing machine which is entirely automatic in its operation and in which each unit upon approaching the glass receiving station is accelerated and then is caused to dwell at said station a sufficient time to receive a quota of glass and is then again accelerated until it reaches its normal place in step with the other units.

These as well as other objects which will readily appear to those skilled in this particular art I attain by means of a machine described in the specification and illustrated in the drawings accompanying and forming a part of this application.

The machine in a general way

In a general way the machine consists of a series (in the machine illustrated 10) of independent units each of which comprises a complete glass forming mechanism. The units are so mounted as to rotate in spaced relation one to the other about a central stationary column or standard so that the units move in succession past a glass receiving station. The movements of the units are so regulated that each unit upon arrival at the glass receiving station lags behind the other units and dwells at said station a sufficient time to receive a quota of glass from an automatic glass feeder with which the machine is timed to operate.

The units are hinged or pivotally connected to rotating top and bottom heads which are mounted upon the central column and the units project radially outward from the center column except when in proximity to the glass receiving station at which time they are caused to swing out of radial position in order to obtain the dwell necessary for receiving the quota of glass.

The units are removably hinged to the rotating heads and any unit may be lifted off without interfering with the other units.

The stationary column or standard is provided with a series of fixed cams for controlling the operations of the different elements entering into the making up of the individual units.

Each unit comprises a neck mold or neck ring, a blank or press mold, a blow mold, a presser head, a blow head, locking means for the blank and blow molds, valves for controlling the operation of the presser and blow heads and operating connections between these elements and the fixed cams on the stationary center column.

A central vertical shaft is mounted for rotation within the center column and drives the rotating heads to which the units are hinged. The upper rotating head carries two air distributing heads, one of which supplies high pressure air for operating the presser and blow heads while the other supplies low pressure air for cooling the molds.

The drawings

In the drawings Figure 1 is a view partially in vertical section and partially in side elevation of a portion of a machine embodying this invention showing one of the individual units hinged to the rotating heads which are carried on the central column or standard together with the cams for controlling the operations of the different elements.

Fig. 2 is a top plan view partially in section taken on line 2—2 of Fig. 1. This view shows six of the ten units and graphically shows the positions of the molds, presser and blow heads and the positioning cam for causing each unit to move out of step with the other units when it is in proximity to the glass receiving station.

Fig. 3 is a sectional view taken on line 3—3 of Fig. 2 looking downwardly. This view illustrates a portion of the means for locking the molds when in closed position. The view also illustrates the cam for operating the mold locks and the springs for holding the inner ends of the units (contact rollers) in contact with the positioning cam.

Fig. 4 is a side view partially in section and partially in elevation and shows the upper part of one of the units and the means for shifting the presser and blow heads into and out of operative position.

Fig. 5 is a top view of the portions of the mechanism shown in Fig. 4 with a part of the same shown in section on line 5—5 of Fig. 4.

Fig. 6 is a diagrammatic view and illustrates the lay-out or relative arrangement of the fixed cams carried on the central column or standard.

Fig. 7 is a side view in section of one of the air distributing valves and its operating cam for controlling the operation of either the presser or blow head.

Figs. 8 and 9 are enlarged detail fragmentary views of the cams and operating arm for controlling the mold locks.

Figs. 10, 11 and 12 are detail views of a safety coupling employed in connection with the mold locks.

Fig. 13 is a diagrammatic lay-out of the presser and blow cylinders, the controlling valves and the distributor heads.

Fig. 16 is a front view in vertical section of the press or blank mold portion of the mold stand. This view illustrates the blank mold in open position.

Fig. 17 is a top plan view of the elements shown in Fig. 16.

Fig. 18 is a detail view of the rack and pinions for operating the press mold.

*The support structure*

Figure 1:
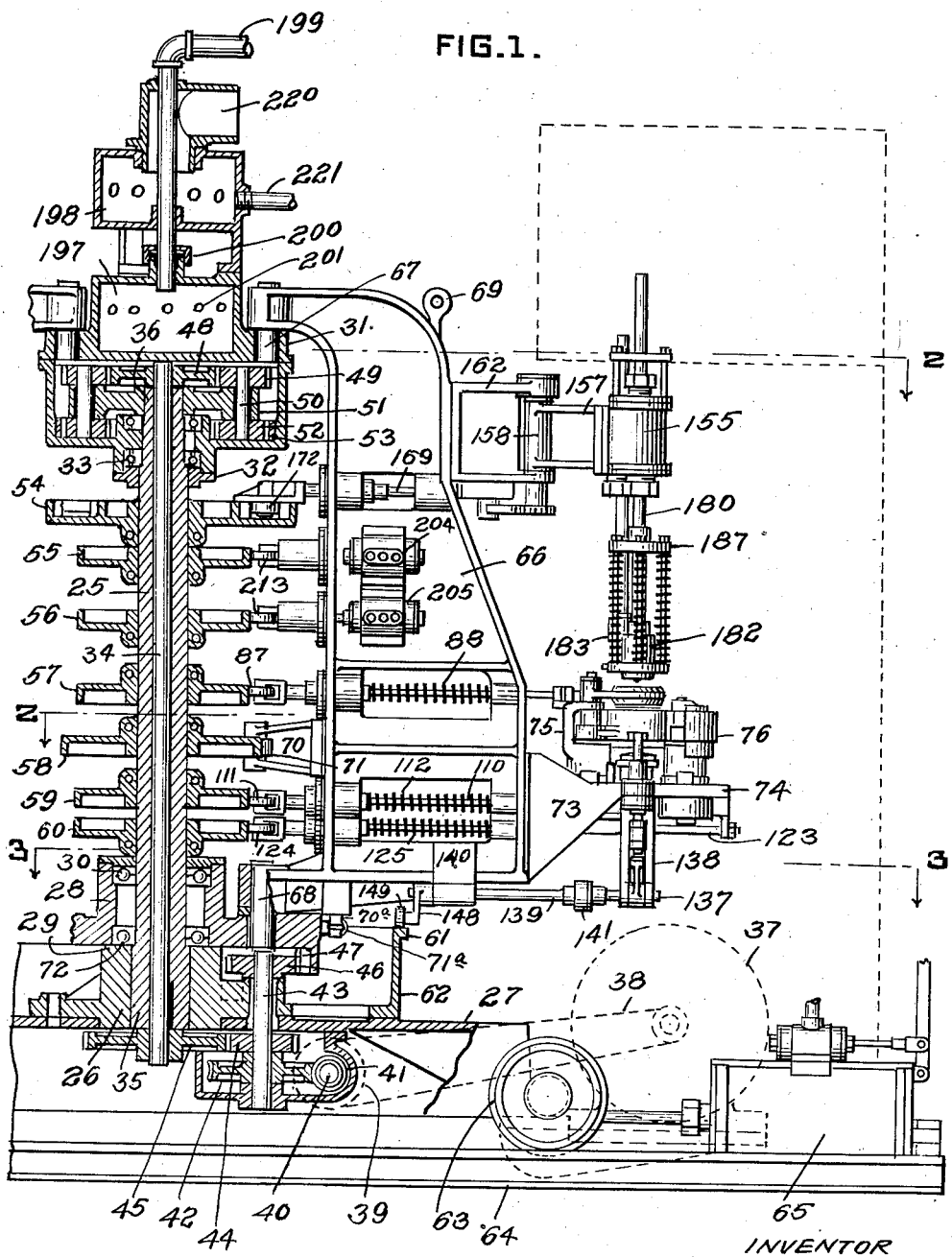

The central standard or column is numbered 25 and this is rigidly secured within a central boss 26 of the base 27 of the machine. The lower rotating head or support member 28 to which the units are pivotally connected bears upon the top 29 of the central hub 26. This lower rotating head is also supported from the stationary column 25 by means of combined radial and thrust ball bearings 30.

The upper rotating head 31 to which the units are also pivotally connected is supported on a bearing collar 32 carried on a shouldered part of the stationary center column 25. This is also supported by means of combined radial and thrust ball bearings 33.

A central drive shaft 34 journaled within bearing bushings 35 and 36 located adjacent the bottom and top respectively of the center column 25 drives the top rotating support head 31 and is in turn driven by a suitable electric motor 37 through a drive chain 38 and sprocket 39 which latter is secured to a horizontal worm shaft 40. A worm 41 keyed on said worm shaft meshes with a worm wheel 42 carried on a vertical shaft 43, and a gear 44 on said vertical shaft meshes with a gear 45 keyed to the central drive shaft 34. At its upper end shaft 43 carries a gear 46 which meshes with an internal gear 47 carried by the lower rotating head 28.

Vertical drive shaft 34 at its top carries a gear 48 which meshes with a gear 49 carried on a stub shaft 50 journaled within a combined support and bearing member 51 secured to the center stationary column 25. Stub shaft 50 at its lower end carries gear 52 which meshes with an internal gear 53 carried by rotating head 31. These gears are so proportioned and arranged that the upper support head 31 and lower support head 28 rotate in the same direction and at the same speed.

The cams

A series of seven cams secured to the center column 25 between the ball bearings 30 and 33 operate or control the operation of the different elements entering into the make up of the individual units of the machine.

The upper cam 54 is a closed or internal cam and operates to swing the presser and blow heads to and from operative position. The second cam 55 operates the valve for distributing air to the presser head. The third cam 56 operates to control the valve for distributing air to the blow head. The fourth cam 57 operates the neck ring or mold. The fifth cam 58 is the positioning cam which causes the individual units throughout the major part of their travel around the center column to project radially outward in spaced relation one to the other and when in proximity to the receiving station to move at an accelerated speed ahead of the other units and to dwell at the receiving station a sufficient time to receive a quota of glass. The next cam 59 operates the presser or blank mold and the bottom cam 60 operates the blow mold.

A cam 61 formed upon the top surface of an upstanding annular flange like member 62 secured to the base, operates the locks for the blank and blow molds. This cam is shown in detail in Figs. 8 and 9.

The base 27 of the machine is mounted upon wheels 63 which run on rails 64 and the machine is adapted to be moved toward and from its position adjacent the automatic feeder by means of an air motor device 65.

The units

The machine of the drawings is provided with ten complete individual units one of which is illustrated in a more or less detailed manner in Fig. 1. The units are identical one with the other and each, comprises a frame 66 provided with aligned upper and lower hinge pins numbered 67 and 68 respectively. The upper rotating head 31 is provided with a series of bushed hinge pin holes arranged in a circle concentric with the center column 25 and of a size to fit hinge pins 67. The lower rotating head 28 is provided with a similar series of bushed hinge pin holes to receive hinge pins 68. Each unit is provided with an eye 69 by means of which it may be raised and lowered to place in the machine.

Each unit, at a point opposite cam 58 on the center column, is provided with an actuating arm 70 which at its inner end carries an anti-friction contact roller 71 adapted to bear upon the outer periphery of cam 58. The downward thrust of each unit is taken on a ball thrust bearing 72.

A pin 70a depends from the frame of each unit and this pin by means of a coil spring 71a is connected to a stud 72a (Fig. 3) which is carried on and projects from the side of lower rotating head 28. These springs hold the rollers 71 in contact with cam 58.

The molds

No single view of the drawings shows the complete mold stand such as each unit is provided with, the molds and their operating mechanisms, however, are shown in detail in Figs. 14 to 23 inclusive. Fig. 1 illustrates the position and arrangement of the mold stand with relation to the other elements entering into the make up of a complete unit, and Fig. 2 graphically illustrates the positions of the molds during the operation of the machine.

The neck ring of each unit is in closed position when the unit reaches the glass receiving station and of course the blank or press mold of each unit is also in closed position when the unit reaches this station.

The upper end of the blank mold surrounds or overlaps the neck mold or ring, and since the blank mold is locked in closed position the neck ring is also locked.

The neck ring remains in closed position until that point in the travel of the unit is reached where the finished article is delivered or removed from the machine. The article during the process of manufacture depends from and is supported at all times by the neck ring.

The neck, blank, and blow molds are all formed as partible molds and separate into halves on their center lines. The single hinge pin for the blank mold and the two hinge pins for the neck mold are located inside of the axis of the molds when in closed position or in other words they lie between said axis and the center column 25 of the machine. The hinge pin for the blow mold lies outside of the axis of the molds when in closed position.

Each unit at a point adjacent its bottom is provided with a supporting bracket 73 and upon this bracket the mold stand is located. This bracket is provided with a horizontal supporting base 74 and to this base hinge pin housings 75 and 76 (Fig. 14) for the blank and blow molds respectively are secured. Housing 75 for the blank mold carries a rigid extension 77 upon the top of which the bottom 78 of the blow mold is secured. This bottom is circular and its upper surface is shaped to conform to the outer surface of the bottom of the finished article.

The neck mold

The neck mold (Figs. 14 and 15) is carried by housing 75 and each of its halves 79 by means of superposed annular ball bearings 80 is mounted to oscillate about a support pin 81 (Fig. 16) which projects upwardly through a flange member 82 which in turn projects laterally from the top of housing 75. The arms 83 which carry the halves of the neck ring proper are each provided with a segmental gear 84 and with these gears a reciprocating rack 85 meshes. This rack is carried at the outer end of a push rod 86 which at its inner end carries an anti-friction roller 87 (Fig. 1) which is held in contact with the periphery of cam 57 by means of a coil spring 88 which surrounds said rod. From this it will be seen that the neck ring is held in closed position by means of spring 88 and is opened at the proper time against the stress of said spring by cam 57.

The blank molds

Figure 14:
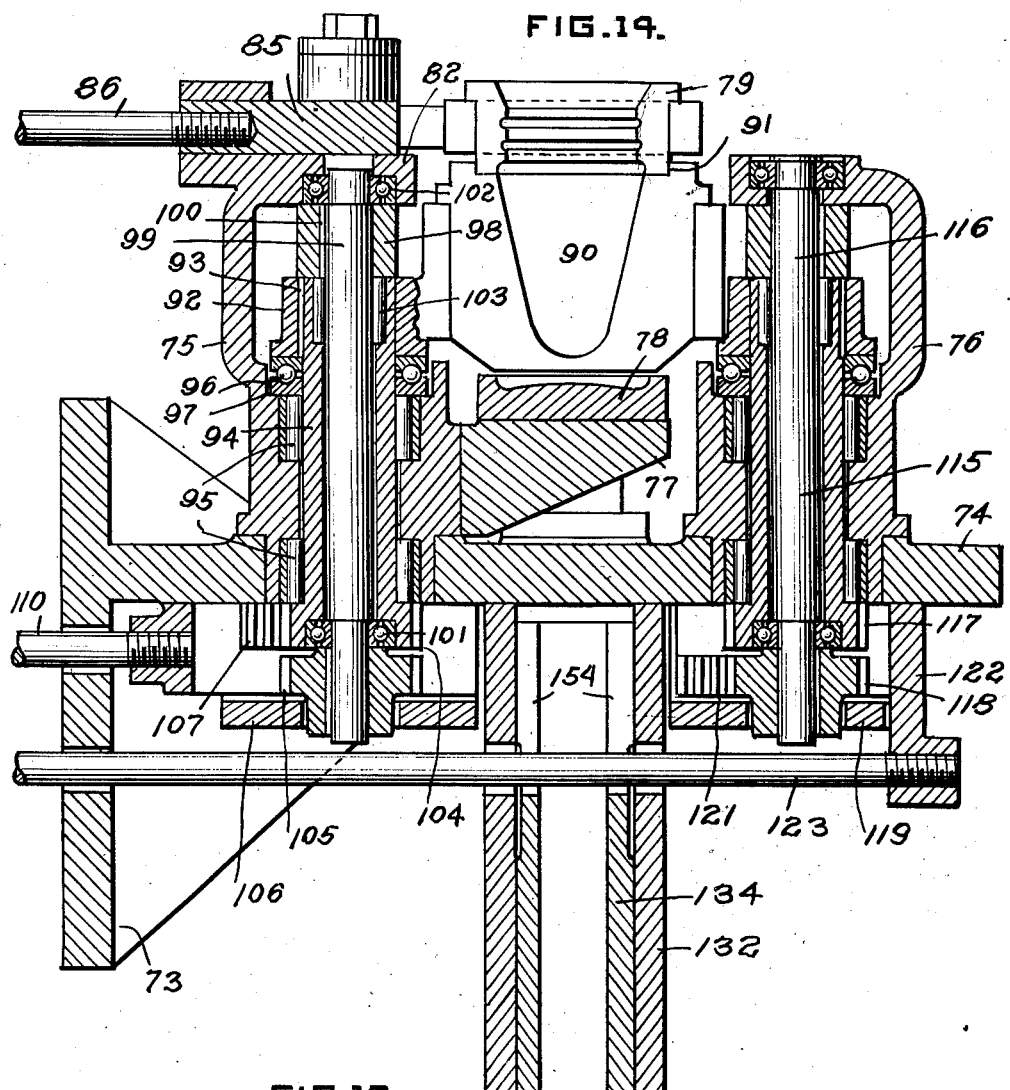
Fig. 14 is a view in side sectional elevation of one of the mold stands. This view illustrates one half of the neck and press or blank molds in closed position.
Figure 15:
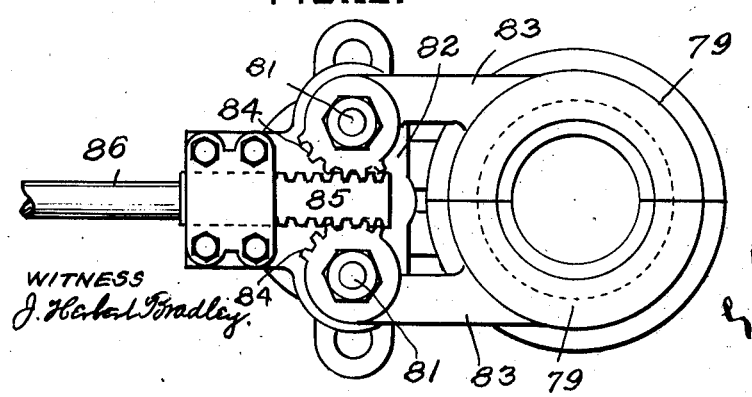
Fig. 15 is a top plan view of the neck mold and illustrates its operating rack and gear segments.
Figure 20:
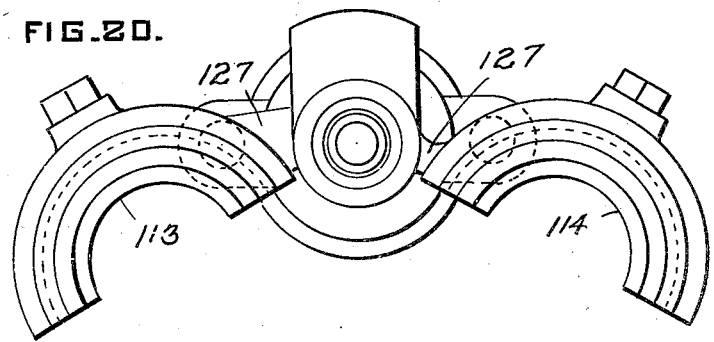
Fig. 20 is a top plan view of the elements shown in Fig. 19.
Figure 19:
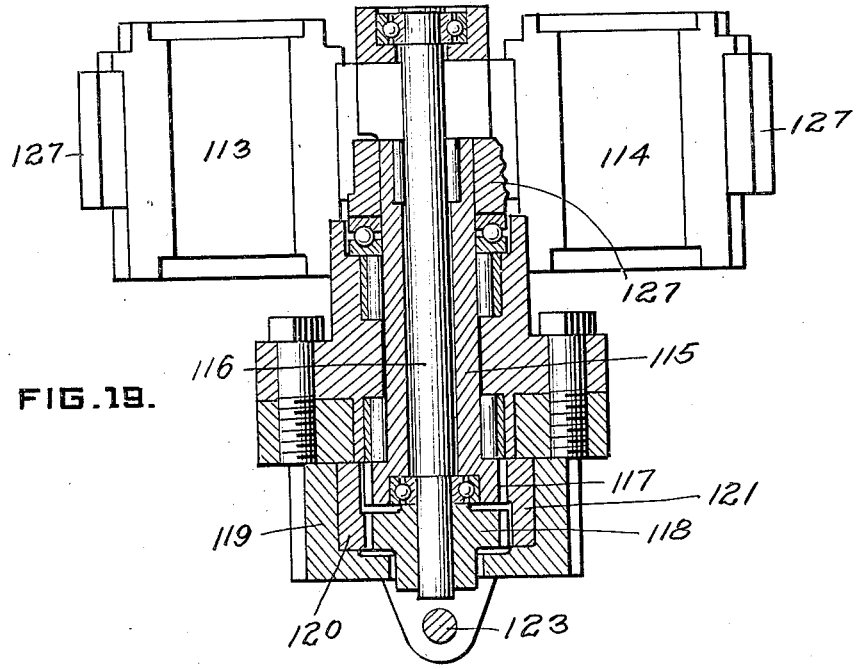
Fig. 19 is a rear view in vertical section of the blow mold portion of the mold stand and this view illustrates the sides of the blow mold in open position. In this machine the position of the bottom of the blow mold is fixed and the press or blank bold when in closed position stands above this fixed bottom of the blow mold.
Figure 21:
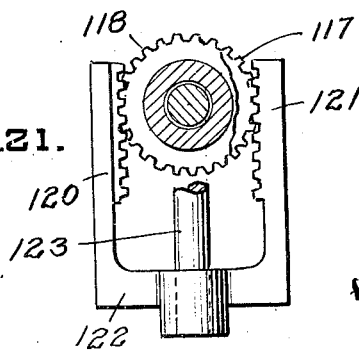
Fig. 21 is a detail view of the rack and pinions for operating the blow mold sides.

The halves 89 and 90 of the blank mold are constructed and arranged so that when in closed position they will surround the lower part of the neck ring as shown at 91, Fig. 14.

Half 90 is provided with a support arm 92 which by means of a key 93 is secured to a rotating sleeve 94. This sleeve is journaled within two superposed roller bearings 95 positioned within housing 75. The downward thrust of the sleeve and mold half is taken on a ball thrust bearing 96 the lower member of which rests upon a shoulder 97 formed in the bore of housing 75.

Half 89 of the blank mold by means of a support arm 98 is carried on a vertical shaft on spindle 99. Support arm 98 is keyed to spindle 99 by means of key 100 and the spindle is supported in position within the sleeve 94 by means of a combined radial and thrust annular ball bearing 101 secured within an enlargement in the lower part of the sleeve. Spindle 99 is also provided with an annular ball bearing 102 at its top, and the outer ring of this ball bearing is secured within housing 75. A roller bearing 103 surrounds spindle 99 and spaces it from the inner surface of sleeve 94.

Sleeve 94 adjacent its bottom is provided with gear teeth 104 and spindle 99 adjacent its bottom carries a gear 105. A support frame 106 secured to the under side of support platform 74 is constructed so as to provide slide ways for two reciprocating racks 107 and 108. These racks as shown in Fig. 18 are connected together by a cross member 109 to form a yoke structure. Rack 107 meshes with gear 104 while rack 108 meshes with gear 105. The yoke structure is secured to a push rod 110 which at its inner end carries an anti-friction contact roller 111 which bears upon the periphery of the cam 59. A coil spring 112 surrounds rod 110 and tends to hold the blank mold in closed position. Cam 59 is arranged to open the blank mold to the position shown in Figs. 16 and 17 at the proper time during each complete cycle of the machine.

The blow molds

Figure 23:
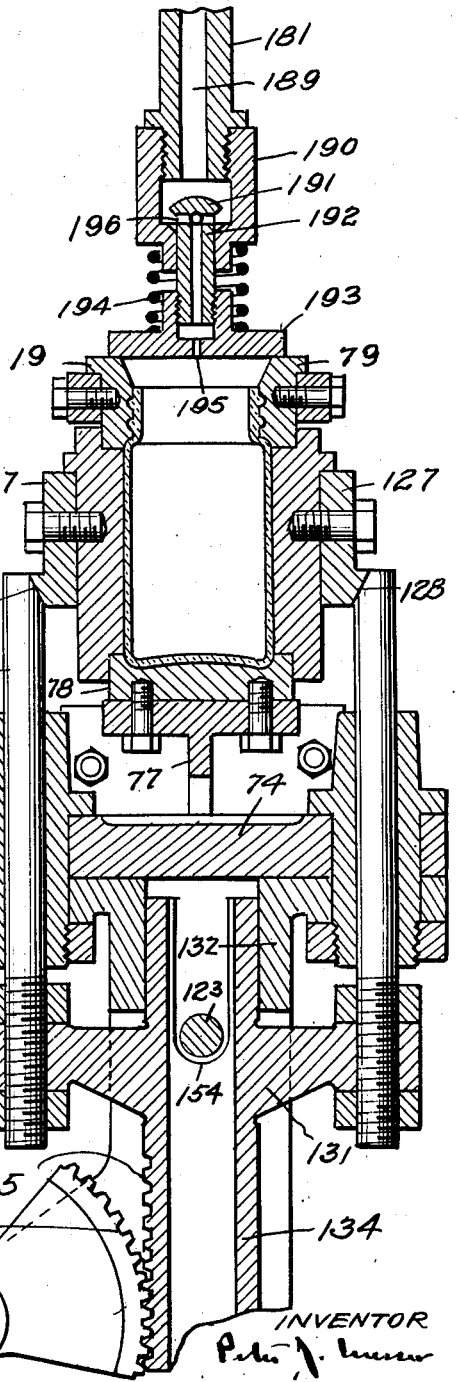
Fig. 23 is a view similar to Fig. 22 of the blow mold locked in closed position around the neck mold and with the blow head lowered to operative position in contact with the neck mold.

As before set forth the bottom of the blow mold is circular and is stationary and the sides of the mold (the sides being formed in halves) close around the stationary bottom and the neck mold as shown in Fig. 23. The halves 113 and 114 of the mold are mounted in the same manner as are the halves of the blank mold, upon a vertical oscillating sleeve 115 and an oscillating spindle 116 journaled in the same manner as sleeve 94 and spindle 99.

Sleeve 115 adjacent its bottom is provided with a gear teeth 117 and spindle 116 adjacent its bottom is provided with a gear 118. A support bracket 119 similar to support bracket 106 is provided for two racks 120 and 121 which are connected together by a cross member 122 into the form of a yoke. Rack 120 meshes with gear 118 while rack 121 meshes with gear 117. Cross member 122 is connected to a push rod 123 which at its inner end carries an anti-friction roller 124. A coil spring 125 surrounds push rod 123 and holds roller 124 against the periphery of cam 60.

The mold lock

Figure 22:
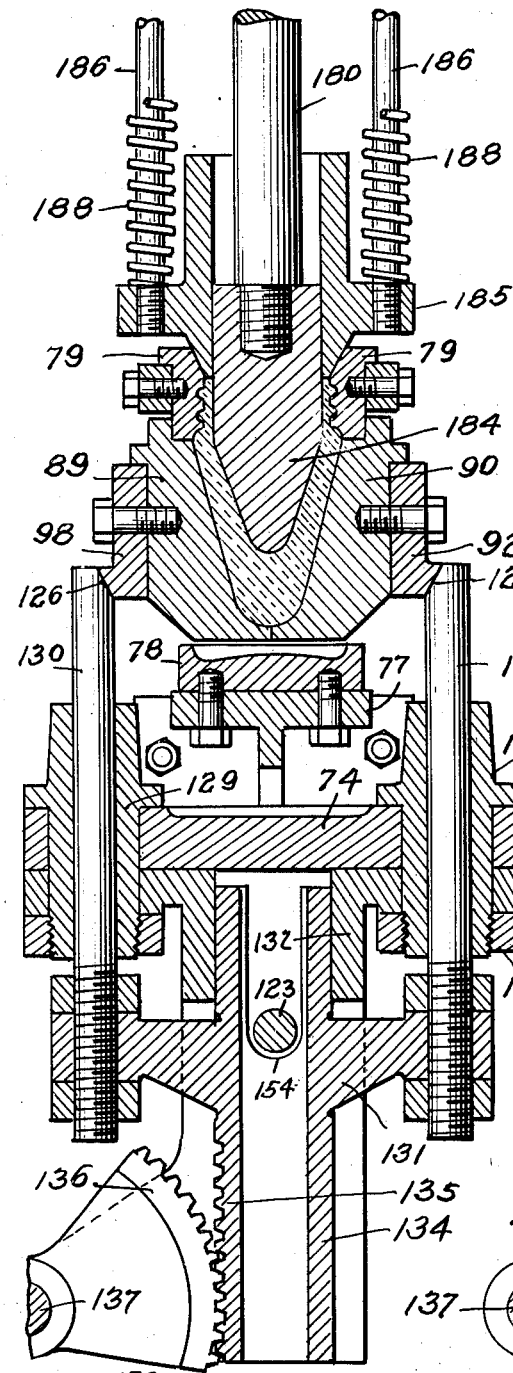
Fig. 22 is a side sectional elevation and illustrates the blank mold locked in closed position above the fixed bottom of the blow mold, the neck mold locked in closed position by the blank mold and the presser head in operative position with the plunger lowered into the blank mold.

The device for locking the blank and blow molds in closed position is illustrated in Figs. 22 and 23, while Figs. 1, 2, 3, 8, 9, 10, 11 and 12 show the details of the mechanism for operating the locking device.

As shown in Figs. 22 and 23, the support arms 92 and 98 for the halves of the blank mold (which support arms extend around the convex sides of the halves of the mold) have their bottom edges beveled as shown at 126, and the support arms 127 of the halves of the blow mold which are similar to the support arms for the halves of the blank mold have their bottom edges beveled as shown at 128.

Support platform 74 on each side of the median line of the molds when in closed position, is drilled to receive bearing sleeves 129—129. Locking rods 130 (common to both the blank and blow molds) vertically reciprocable within said sleeves 129 are beveled at their tops to correspond to the bevels on the blank and blow mold support arms at 126 and 128. At their lower ends, these locking rods are secured to a cross head 131 which is mounted for vertical reciprocation within a cross head guide 132. The cross head guide is secured to support platform 74 by means of the bearing sleeves 129 and nuts 133. An extension 134 of the cross head is cut to form a rack 135 and a gear segment 136 mounted upon a shaft 137 meshes with this rack. Shaft 137 is a stub shaft and is journaled within a depending hanger 138 secured to support platform 74. A shaft 139 journaled in a hanger 140 which depends from unit frame 66 is connected to shaft 137 by means of a spring coupling 141.

One part 142 of the coupling which is provided with diametrically opposed stops 143 is keyed to stub shaft 137, while the other part 144 of the coupling is keyed to shaft 139. Part 144 is provided with an annular channel 145 and at diametrically opposed points in this channel, stops 146 are positioned. Two coil springs 147 are located within the annular channel 145 and each at opposite ends abuts against one stop 146 and one stop 143.

Shaft 139 at its inner end is provided with a crank arm 148 which is rigidly secured to said shaft and said crank at its lower end carries a contact roller 149 (Figs. 1, 3, 8 and 9). Roller 149 bears on the upper surface of cam 61. This cam is provided with two depressions 150 and 151 (Figs. 8 and 9) and above each depression, the cam is closed by means of a flange 152, in the case of depressions 150 and by a flange 153 in the case of depression 151. These flanges are formed on two plates which are bolted to the side of cylindrical member 62, as graphically shown in Figs. 8 and 9.

As each unit travels around the center column 25 of the machine, the combined shaft 137—139 will be rocked by means of cam 61 to first lock the blank and then the blow mold in closed position. The spring coupling is provided as a safety device and will yield if for any reason either of the molds cannot be closed.

Cross head guide 132 as well as an upper extension 154 of the cross head is slotted, and push rod 123 which operates racks 120 and 121 passes through these slots in the cross head and cross head guide (Figs. 14, 22 and 23).

The presser and blow heads

Each unit is provided with its own presser head and blow head which travel with the unit. These, as well as the cylinders which operate the same, are of ordinary construction and in themselves form no part of this invention. Fig. 1 illustrates their arrangement with relation to the units and Figs. 1, 2, 4 and 5 illustrate more or less their construction and method of mounting. Figs. 22 and 23 illustrate the presser and blow heads in position on the blank and blow molds respectively.

The presser and blow cylinders 155 and 156 respectively are mounted side by side upon a swinging bracket 157 provided with a cylindrical member 158 which is keyed to a spindle 159 (Figs. 4 and 5). This spindle is mounted in combined radial and thrust ball bearings 160 and 161 carried in a bracket 162 secured to the upper end of frame 66 of the unit.

Spindle 159 at its lower end carries a gear 163 which meshes with a gear sector 164 secured to a stub shaft 165 journaled within a bearing member 166 formed as part of support frame 162. Stub shaft 165 in addition to gear sector 164 carries a gear sector 167 and this latter gear sector meshes with a reciprocating rack 168 secured to a push rod 169. This push rod is carried by a squared rod 170 mounted for reciprocation within a bushing 171 mounted in the unit frame 66. The inner end of rod 170 is provided with an anti-friction roller 172 which engages with internal cam 54. Push rod 169 is threaded into rod 170 and locked in position by means of a lock nut 173, thus providing means for adjusting the combined length of the rod made up of the parts 169 and 170. From this construction, it will be seen that as push rod 169 is reciprocated, the presser and blow cylinders 155 and 156 and the press and blow heads carried thereby will be swung horizontally to one side or the other about the center of spindle 159.

A device for taking up the back lash between gear sector 164 and gear 163 is provided. This consists of a spring pressed plunger 174 which contacts with a projection 175 formed on sleeve 158. The plunger and its spring 176 are located in a cylindrical housing 177 mounted on the side of the web 178 of bracket 162.

The presser and blow cylinders are each provided with inlet and exhaust ports and pipes as shown in Fig. 13, and each is provided with a piston (not shown) as is now customary. Piston rods 180 and 181 for the presser and blow cylinders respectively are secured to said pistons and project above and below the cylinders as shown in Figs. 1, 4 and 13. Piston rod 180 for the presser cylinder carries a presser head 182 shown in detail in Fig. 22 and piston rod 181 for the blow cylinder carries a blow head 183 shown in detail in Fig. 23.

Piston rod 180 at its lower end carries a plunger 184 which slides through a mold ring 185 mounted on rods 186. These rods are slidable through holes formed in a support plate 187 secured to rod 180 and mold ring 185 is held toward the lower limit of its movement by means of coil springs 188 which surround rods 186.

Piston rod 181 is provided with a central air passage 189 and to the lower end of this rod, a valve housing 190 is secured. A valve 191 located within said housing is provided with a cylindrical stem 192 which projects downwardly through the end of said housing and to the lower end of this a blow head plate 193 is secured. A coil spring 194 surrounds the lower portion of the valve housing and tends to force the blow head plate away from the valve housing. Valve 191 however, limits the movement of the plate away from the housing. Valve stem 192 is hollow and plate 193 is provided with a central air aperture 195. Radial holes 196 are drilled through the valve stem below the valve 191. From this construction, it will be seen that as the blow head plate 193 contacts with the top of the neck ring or mold and unseats valve 191 air under pressure will enter the valve housing through the piston rod 181 and will pass through into the blow mold.

The air distributing system

The upper rotatable head 31 carries two air distributing chambers 197 and 198 (Figs. 1 and 13). Chamber 197 which is the high pressure air distributing chamber receives air under suitable pressure (30 to 40 lbs.) from any suitable source through a pipe connection 199. This pipe enters chamber 197 axially, the joint being sealed by means of a stuffing box 200. Chamber 197 is provided with a series (10 in this instance) of equally spaced air distributing pipes 201, one for each unit. Branch pipes 202 and 203 lead to the center ports of the control valves 204, and 205 respectively. These valves are piston valves of ordinary construction and the pistons 206 and 207 thereof are held in the position shown in Figs. 7 and 13 by means of coil springs 208 which surround the valve stems 209. Each valve stem is secured to a member 210 mounted for reciprocation within a guide member 211 secured to the frame of the unit (Fig. 7). Members 210 are prevented from turning by means of keys 212 which operate within slots provided for that purpose in the members. Anti-friction rollers 213 carried at the inner ends of the members contact with cam 55 or 56 as the case may be depending upon whether it is the valve controlling the presser or blow cylinder.

With the piston 206 of valve 204 (which valve controls the presser head) in the position shown in Fig. 13, air entering the valve through pipe 202 passes through pipe 214 to the bottom of the presser cylinder or beneath its piston and raises the presser head. The air above the piston exhausts through pipe 215 and passes out through the open end 216 of the valve casing. When valve 206 is moved to the opposite end of its travel, air entering the valve through pipe 202 passes through pipe 215 to the upper side of the presser cylinder piston and the air below the piston exhausts through pipe 214.

With valve 207 in the position shown in Fig. 13 (which valve controls the blow head) air from branch pipe 203 enters the valve casing, and by means of pipe 217 passes to the blow cylinder below its piston. The air above the piston exhausts through pipe 218 and the open end 219 of valve casing 205.

Air distributing chamber 198 is supplied with air at relatively low pressure (2 or 3 lbs.) from any suitable source through an air connection 220. A series of pipes 221, one for each unit, distributes this low pressure air to the molds for the purpose of cooling them in the well known manner.

The cam layout

Figure 2:
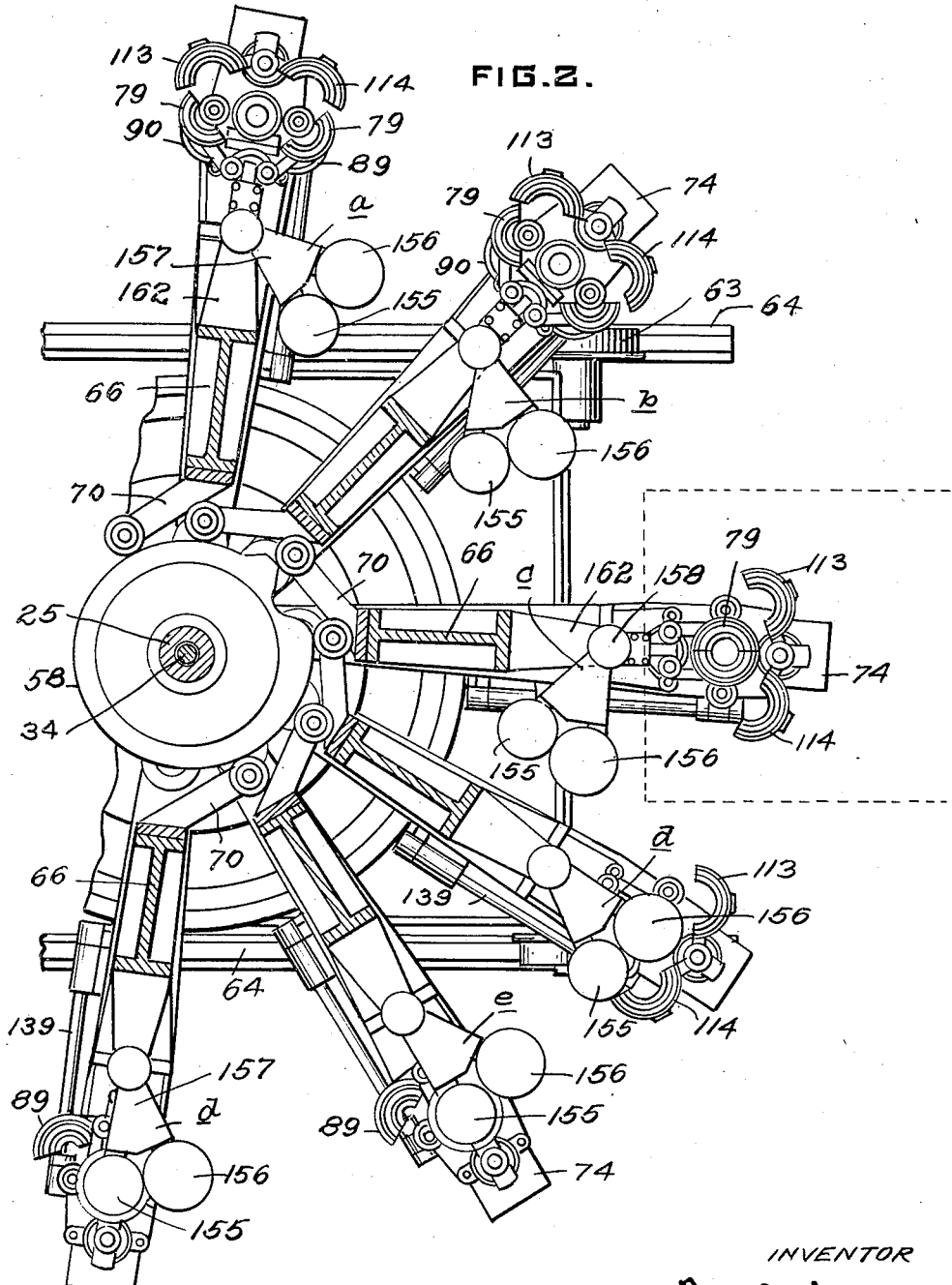

The cams on the center column 25 except cam 58, which is illustrated in detail in Fig. 2, are diagrammatically illustrated in Fig. 6, and this view shows the timing of the elements controlled thereby. For the purpose of clearness, the cams have been superposed upon one another and have been numbered as they are in Fig. 1. Timing of the operations of the different elements during each complete cycle of operation of a single unit is graphically set forth by legends.

Operation

During operation, the machine rotates continuously so that the units are carried in succession around the machine and past the glass receiving station at which the glass feeder is located. As before said when each unit approaches the glass receiving station, its speed is accelerated so that it reaches the station ahead of the time it would if traveling normally. When each unit reaches the station its neck mold and blank mold are closed and locked in closed position. The presser and blow heads are swung to one side as shown at positions a, b, and c, Fig. 2. Each unit dwells at the glass receiving station a sufficient length of time to receive a quota of glass and after receiving the quota its speed is accelerated until it reaches position d. During its acceleration, the presser head moves to position over the molds, air is admitted to the presser cylinder and the parison is formed in the blank mold. During movement from position d to position e the presser head plunger is raised out of the blank mold, the blank mold is unlocked, is swung open and the blow mold swings into place around the parison which is supported by the neck ring. In moving from position e to position d the blow mold is locked in closed position, the blow head is swung over the mold and the blow head plate is lowered into contact with the neck ring. During the remainder of the travel to the point at which the finished article is removed from the neck ring, the blowing operation takes place, the blow mold is unlocked and opened, and at the point of delivery of the finished ware the neck ring opens. After the blowing operation has been accomplished, the presser and blow heads are swung to position a.

It will be apparent that this machine can be operated in conjunction with two automatic feeders positioned on opposite sides of the machine. Of course, in order to do this it will be necessary to modify the actuating cams so that there will be two pressing and blowing operations during each complete cycle of the machine. In a machine for operation with two glass feeders it is desirable to enlarge the machine and have twenty instead of ten units. It is apparent that the machine may be enlarged so as to take care of any number of units desired.

The lobes or raised portions of the cams on the center support are formed separately from the body members in order that they may be changed to meet the requirements for different kinds of ware or different conditions of glass.

The particular machine of this application is adapted to the manufacture of wide mouth ware such as wide mouth bottles.

While I have described and illustrated but one embodiment of my invention, it will be apparent to those skilled in the art that various changes, modifications, substitutions and additions may be made in the apparatus illustrated without departing from the spirit and scope of the invention as set forth by the appended claims.

I claim:

1. In a machine for making glass articles, a series of article-forming units, each of which includes a neck mold, a blank mold pivoted at one side of said neck mold, a blow mold pivoted at another side thereof, presser and blow heads pivotally mounted above said neck mold, means for successively moving said blank and blow molds into operative relation with said neck mold and means for successively moving said presser and blow heads into operative relation with said neck mold for cooperating with said blank and blow molds, respectively, in forming an article.

2. In a machine for making glass articles, a support, upper and lower supporting means rotatably mounted thereon, a series of article-forming units, each of which includes a neck mold, blank and blow molds and presser and blow heads adapted to form a finished article, said units being hinged to said upper and lower supporting means, means for continuously rotating said supporting means for causing said units to move in succession past a glass receiving station and means for moving each of said units about its hinges when adjacent said station so as to cause a lag in said unit at said station a sufficient time for said unit to receive a quota of glass.

3. In a machine for making glass articles, a support, upper and lower supporting means rotatably mounted on said support, a series of frames hinged to said upper and lower supporting means and rotatable therewith, each of said frames forming a support for a complete article-forming mechanism including a partible neck mold, partible blank and blow molds pivoted upon opposite sides of said neck mold, means for rotating said units about said support, means for successively moving said blank and blow molds into cooperative relation with said neck mold, presser and blower heads pivoted to each frame above said neck and means for oscillating said presser and blower heads so as to successively position them in operative relation with said neck mold for cooperating with said blank and blow molds, respectively in forming an article.

4. In a machine for making glass articles, upper and lower rotating heads, having aligned hinge pin holes, a swinging frame provided with spaced hinge pins adapted to be mounted in said holes for removably supporting said frame on said head and article forming mechanism mounted on said frame.

In testimony whereof, I have hereunto subscribed my name this 11th day of October, 1932.

PETER J. MESSER.